G. B. FOOTE.
Vise.

No. 213,816.　　　　　　Patented April 1, 1879.

Witnesses;

Granville Stuart
T. H. Kleinschmidt

Inventor

George B. Foote

UNITED STATES PATENT OFFICE.

GEORGE B. FOOTE, OF HELENA, MONTANA TERRITORY.

IMPROVEMENT IN VISES.

Specification forming part of Letters Patent No. 213,816, dated April 1, 1879; application filed March 21, 1877.

*To all whom it may concern:*

Be it known that I, GEORGE B. FOOTE, of Helena, in the county of Lewis and Clarke and Territory of Montana, have invented a new and useful Improvement in Vises, which improvement is fully set forth in the following specification, reference being had to the accompanying drawings, in which—

Figure 1:
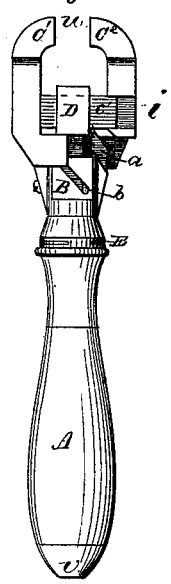
Figure 6:
Figure 2:
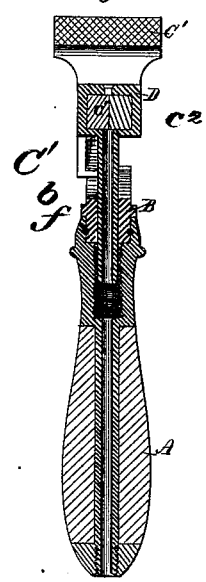
Figure 3:
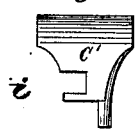
Figure 4:
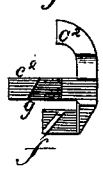
Figure 5:
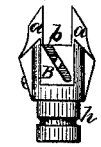

Figure 1 represents a hand-vise constructed in accordance with my invention. Fig. 2 represents a longitudinal section of the same through the line $u$ $v$ in Fig. 1. Fig. 3 is a back view of one of the movable jaws. Fig. 4 is an inside view of one of the movable jaws. Fig. 5 is a front view of the sleeve which operates the jaws. Fig. 6 is a side view of the shank to which the moving parts are attached.

This invention relates to that kind of vises in which the jaws are attached to a shank and opened and closed by means of a screw formed on such shank.

The object of my invention is to give a parallel motion to the jaws equally on each side of the central line of the shank, to dispense with springs for opening the jaws, to make it positive in all its motions without interfering projections, and strong in its construction. This I accomplish by the means and in the manner substantially as herein specified, and as shown in the accompanying drawings, in which the same letters refer to the same parts.

In the drawings, A represents the handle, which is screwed onto the shank. B represents the sliding sleeve for opening and closing the jaws through the medium of the wedges $a$ $a$ and the inclined slots $b$, upon which sleeve the handle A revolves, the two being held together by the pin E, fitting into the groove $h$ in the sleeve B.

$C^1$ $C^2$ represent the jaws, $c^1$ $c^2$ being the bars or guides, passing through the head of the shank D and into a corresponding slot, $i$, in the opposite jaw. These bars or guides are cut away, as represented in Fig. 4, in order to form an opening to allow long wires or rods to be passed through the center of the vise, and also to form the inclined face $g$, upon which the wedges $a$ $a$ slide to tighten the jaws.

Inclined projections $f$ on the inside of the lower part of the jaw-pieces fit into corresponding slots $b$ in the sleeve B, forming supports for the lower ends of the jaws when they are tightened, and also a means of throwing the jaws apart without the use of springs.

D is the shank, upon the lower end of which a screw is formed for operating the vise. A hole is drilled entirely through the handle A, and also through the shank D, for the purpose of admitting long wires or rods to be passed entirely through the center of the vise.

The operation of the vise is as follows: Upon inserting any article between the jaws of the vise the jaws are held stationary, while the handle is turned to the right, forcing the sleeve B up along the shank. The wedges $a$ $a$ bear against the inclined faces $g$, formed on the inside of the bars or guide-pieces $c^1$ $c^2$, forcing the jaws together.

In order to prevent binding and to form a support counter to the pressure upon the face of the jaws, slots are cut in the sleeve B at $b$, which slots are formed on the same angle to the shank as the face of the corresponding wedges. The wedges $a$ $a$ are supported by fitting and moving against the face of the head of the shank D, as represented.

To release any article held in the vise, the handle is turned to the left, thereby withdrawing the wedges $a$ $a$ from contact with $g$, and at the same time the projections $f$ slide in the slots $b$ and open the jaws.

I am aware that hand-vises have been heretofore constructed which are operated by a screw formed on the shank and a taper cone or similar device operating on jaws pivoted to the shank.

I am also aware that hand-vises have been constructed with parallel jaws operated in equal distances each side of the central line of the shank by means of a thumb-screw on the side.

I therefore do not claim, broadly, the principle of operating the jaws by means of a screw on the shank; nor do I claim the principle of operating the jaws parallel and in equal distances each side of the central line of the shank; but

What I claim as new, and desire to secure by Letters Patent, is—

1. The jaws $C^1$ $C^2$, having the bars or guides $c^1$ $c^2$, passing through the head of the shank D and into a slot, $i$, in the opposite jaw, as specified.

2. The sleeve B, having the wedges $a$ $a$ and slots $b$, substantially as specified, and for the purpose set forth.

GEORGE B. FOOTE.

Witnesses:
 GRANVILLE STUART,
 T. H. KLEINSCHMIDT.